(12) United States Patent
Liu et al.

(10) Patent No.: US 12,206,162 B2
(45) Date of Patent: Jan. 21, 2025

(54) THREE-DIMENSIONAL GRAPHENE ANTENNA AND PREPARATION METHOD THEREOF

(71) Applicant: Xi'an Technological University, Shaanxi (CN)

(72) Inventors: Huan Liu, Shaanxi (CN); Jijie Zhao, Shaanxi (CN); Jinmei Jia, Shaanxi (CN); Yuxuan Du, Shaanxi (CN); Shuai Wen, Shaanxi (CN); Minyu Bai, Shaanxi (CN); Fei Xie, Shaanxi (CN); Wanpeng Xie, Shaanxi (CN); Weiguo Liu, Shaanxi (CN)

(73) Assignee: Xi'an Technological University, Shaanxi (CN)

( * ) Notice: Subject to any disclaimer, the term of this patent is extended or adjusted under 35 U.S.C. 154(b) by 422 days.

(21) Appl. No.: 17/505,653

(22) Filed: Oct. 20, 2021

(65) Prior Publication Data
US 2022/0045419 A1  Feb. 10, 2022

(30) Foreign Application Priority Data

Dec. 31, 2020  (CN) .......................... 202011641314.1

(51) Int. Cl.
*H01Q 1/36* (2006.01)
*C01B 32/184* (2017.01)
(Continued)

(52) U.S. Cl.
CPC ........... *H01Q 1/368* (2013.01); *C01B 32/184* (2017.08); *H01Q 9/0407* (2013.01);
(Continued)

(58) Field of Classification Search
CPC .... H01Q 1/368; C01B 32/184; C01B 32/194; C01B 32/184194
See application file for complete search history.

(56) References Cited

U.S. PATENT DOCUMENTS

2017/0178824 A1* 6/2017 Kaner ...................... C09D 5/24

FOREIGN PATENT DOCUMENTS

CN          103058179 A  *  4/2013

OTHER PUBLICATIONS

Hummers, William S.; Offeman, Richard E. (Mar. 20, 1958). "Preparation of Graphitic Oxide". Journal of the American Chemical Society. 80 (6): 1339. doi:10.1021/ja01539a017 (Year: 1958).*

* cited by examiner

*Primary Examiner* — Livius R. Cazan

(57) ABSTRACT

A three-dimensional graphene antenna includes a three-dimensional graphene radiation layer, a dielectric substrate, a metal layer and a feeder line. The three-dimensional graphene radiation layer is made from porous three-dimensional graphene. A preparation method of the porous three-dimensional graphene includes steps of preparing pressurized solid particles by pressurizing gas into solid micro particles, mixing the pressurized solid particles with a graphene oxide dispersion liquid, removing liquid nitrogen under high pressure and low temperature such that the graphene oxide flakes enwrap around the pressurized solid particles, obtaining a graphene oxide block containing the pressurized solid particles by extruding, sublimating the pressurized solid particles in the graphene oxide block into gas, forming holes in the graphene oxide block and annealing, thereby obtaining the three-dimensional graphene. The three-dimensional graphene has a porous three-dimensional conductive network structure, which is able to be in any shape without any pollution.

5 Claims, 2 Drawing Sheets

(51) Int. Cl.
*C01B 32/194* (2017.01)
*H01Q 9/04* (2006.01)
(52) U.S. Cl.
CPC ........ *C01B 32/194* (2017.08); *C01B 2204/22* (2013.01); *C01B 2204/24* (2013.01)

THREE-DIMENSIONAL GRAPHENE ANTENNA AND PREPARATION METHOD THEREOF

CROSS REFERENCE OF RELATED APPLICATION

The present invention claims priority under 35 U.S.C. 119(a-d) to CN 202011641314.1, filed Dec. 31, 2020.

BACKGROUND OF THE PRESENT INVENTION

Field of Invention

The present invention relates to the field of antenna and low-dimensional material technology, and more particularly to a three-dimensional graphene antenna and a preparation method thereof.

Description of Related Arts

In the Internet of Things society, data transmission and reception mainly rely on antennas. As the front-end equipment in the Internet of Things system, the superior performance of the antenna directly affects the whole Internet of Things system. However, the traditional antenna radiation patches are mostly made of metal, but metal materials have disadvantages such as low photoelectric efficiency, high bit error rate, and non-corrosion resistance. If graphene with better performance is used instead of metal, the electrical conductivity, thermal conductivity, and corrosion resistance of the antenna are improved while the cost is reduced, so that the performance of the antenna is improved, and the popularization of the Internet of Things is accelerated.

Graphene is a new nanomaterial. From the morphological point of view, it presents a single-layer flake-shaped structure, which is able to be regarded as a two-dimensional planar film formed by $sp^2$ hybridization of carbon atoms. The film has a hexagonal honeycomb structure. In the past research, it was found that graphene is always unable to exist independently and stably, so it is considered to be a hypothetical structural material. Until 2004, Andre Geim and Konstantin Novoselov at the University of Manchester in the United Kingdom separated two-dimensional single-layer graphene for the first time in history and kept its structure stable. As a result, graphene became widely known and developed rapidly. So far, the research and application of graphene have gone through more than 60 years. Compared with some traditional materials, graphene has more excellent properties, such as in the fields of physics, chemistry and materials. The a bond formed between the carbon atoms in the graphene has super-strong bond energy, which makes the graphene have high hardness; and the free electron network formed by it electrons which are perpendicular to the plane gives the graphene unique electrical and thermal conductivity characteristics. Compared with traditional conductors, the hole mobility on the surface of graphene is much higher, which makes graphene have extremely high transportability and free electron movement space. In addition, graphene also has other more unique and excellent properties. For example, single-layer graphene has high light transmittance and is able to be used as an ideal material for transparent electrodes; good gas barrier capability is also available in graphene. Because of these excellent properties, graphene has great application prospects in electronics, information, materials, energy, and biomedicine.

Two-dimensional graphene has the advantages of high electron mobility and is able to replace the metal in the traditional microstrip antenna radiation patch. However, the thickness of single-layer graphene is only 0.35 nm, which is difficult to identify and operate, thereby limiting the practical application of graphene in microstrip antennas. The traditional preparation method of three-dimensional graphene is not only complicated, but also brings other impurities, which has a certain impact on the physical and chemical properties of the prepared three-dimensional graphene.

SUMMARY OF THE PRESENT INVENTION

To overcome the shortcomings in the prior art, the present invention provides a three-dimensional graphene antenna and a preparation method thereof. The three-dimensional graphene antenna provided by the present invention has low resistivity, high precision, and good use performance, and is able to be widely used in the fields of electronics, information, materials, energy, biomedicine, etc.; the preparation method provided by the present invention is simple, easy to implement, green and environmentally friendly, and highly efficient and energy-saving. The prepared three-dimensional graphene has a porous three-dimensional conductive network structure, which is able to be in any shape without any pollution.

Accordingly, in order to achieve the above object, the present invention provides technical solutions as follows.

A three-dimensional graphene antenna comprises a three-dimensional graphene radiation layer, a dielectric substrate, a metal layer and a feeder line, wherein the three-dimensional graphene radiation layer is attached to a top surface of the dielectric substrate, the metal layer is attached to a bottom surface of the dielectric substrate, the feeder line is provided at one side of the three-dimensional graphene radiation layer and on the dielectric substrate.

Preferably, the three-dimensional graphene radiation layer is made from porous three-dimensional graphene.

Preferably, the dielectric substrate is made from a low dielectric constant material with a dielectric constant lower than 2.7.

A preparation method of the three-dimensional graphene antenna comprises steps of:
(A) selecting a material with low dielectric constant as a dielectric substrate;
(B) preparing the three-dimensional graphene radiation layer which comprises:
(B1) under low temperature and high pressure, pressurizing gas whose intermolecular force is greater than repulsive force into a solid, and crushing the solid into solid micro particles which are pressurized solid particles;
(B2) preparing graphene oxide flakes, obtaining a graphene oxide dispersion liquid by distributing the graphene oxide flakes in liquid nitrogen at the temperature below −200° C. and the pressure above 0.5 MPa;
(B3) obtaining a mixed solution containing the pressurized solid particles and the graphene oxide flakes by adding the pressurized solid particles into the graphene oxide dispersion liquid, the graphene oxide flakes enwrapping around the pressurized solid particles by removing the liquid nitrogen in the mixed solution through increasing a temperature of the mixed solution under the high pressure, wherein the increased temperature is lower than a sublimation temperature of the pressurized solid particles, and after all of the graphene oxide flakes in the mixed solution enwrap around the pressurized solid particles, obtaining a graphene oxide block containing the pressurized solid particles by extruding; and (B4) sublimating the pressurized solid particles in the graphene oxide block into gas by increasing a temperature and decreasing a pressure of the graphene oxide block, forming holes in the graphene oxide block, obtaining the porous three-dimensional graphene by annealing in a vacuum condition, and obtaining the three-dimensional graphene radiation layer by transferring the porous three-dimensional graphene to the top surface of the dielectric substrate; and (C) preparing the feeder line and the metal layer, which comprises:

(C1) plating a layer of metal on the bottom surface of the dielectric substrate as the metal layer, wherein a stable radiation field is formed between the metal layer and the three-dimensional graphene radiation layer; and (C2) depositing a metal strip as the feeder line at one side of the three-dimensional graphene radiation layer for transmitting signals produced by the radiation field, thereby obtaining the three-dimensional graphene antenna.

Preferably, the pressurized solid particles have a size in a range of 50 nm and 1 μm.

Preferably, in the step (B3), the liquid nitrogen in the mixed solution is removed by increasing the temperature in a range of −200° C. and −120° C., which is able to ensure volatilization of the liquid nitrogen, and the solid micro particles formed by gas condensation do not volatilized.

Preferably, a density of the holes is determined by a quantity of the solid micro particles in the graphene oxide dispersion liquid.

Preferably, a size of each of the holes is determined by a size of each of the solid micro particles.

The three-dimensional graphene radiation layer, used in the three-dimensional graphene antenna provided by the present invention, is made from a porous material on the basis of two-dimensional graphene, and has a three-dimensional conductive carbon network structure. It not only inherits the excellent properties of two-dimensional graphene, but also has a larger specific surface area, faster electron transmission and higher mechanical strength than two-dimensional graphene. Moreover, it has corrosion resistance, is visible to the naked eye, is easy to be operated and is suitable for specific applications. In addition, the preparation method of three-dimensional graphene antenna provided by the present invention is simple and easy to implement, and uses the pressurized solid particles formed by gas compression as a template, which neither pollutes the environment nor brings other impurities to the prepared novel three-dimensional graphene. Therefore, the three-dimensional graphene antenna is energy-saving and efficient.

DETAILED DESCRIPTION OF THE PREFERRED EMBODIMENT

In order to make the technical solutions and advantages of the present invention clearer, the present invention will be explained in detail with reference to the drawings and specific embodiments as follows.

Figure 1:
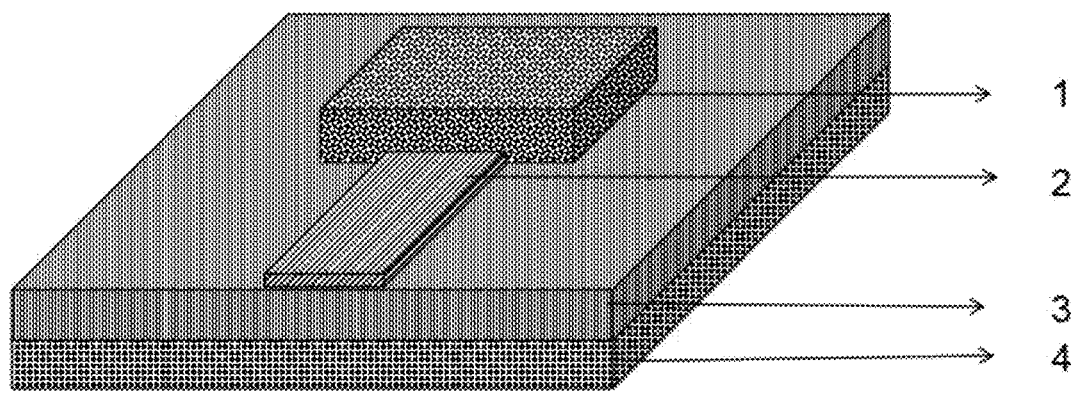
FIG. 1 is a structurally schematic view of a three-dimensional graphene antenna provided by the present invention.

Referring to FIG. 1, a three-dimensional graphene antenna according to a preferred embodiment of the present invention is illustrated, which comprises a three-dimensional graphene radiation layer 1, a dielectric substrate 3, a metal layer 4 and a feeder line 2, wherein the three-dimensional graphene radiation layer 1 is attached to a top surface of the dielectric substrate 3, the metal layer 4 is attached to a bottom surface of the dielectric substrate 3, the feeder line 2 is provided at one side of the three-dimensional graphene radiation layer 1 and on the dielectric substrate 3 for transmitting radiation field signals formed between the three-dimensional graphene radiation layer 1 and the metal layer 4.

A preparation method of the three-dimensional graphene antenna comprises steps as follows.

(1) Preparation of a Graphene Oxide Dispersion Liquid

Figure 2:
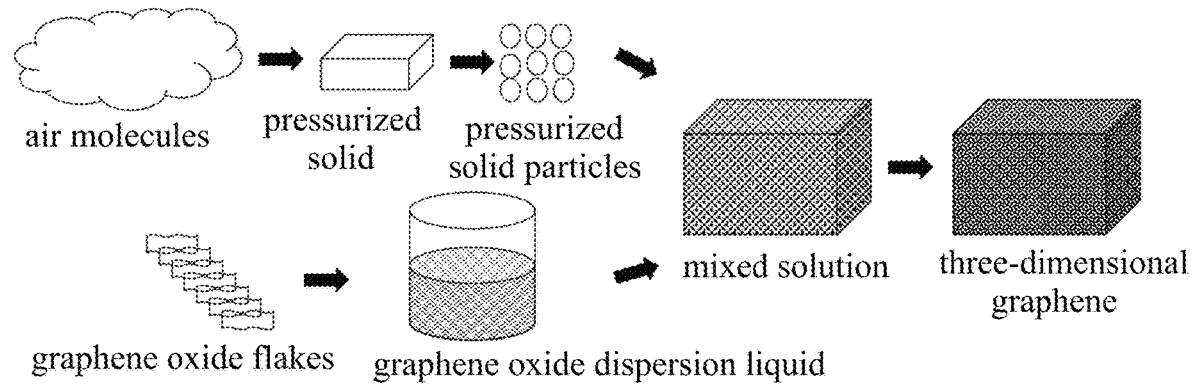
FIG. 2 is a flow chart of preparing the three-dimensional graphene antenna.

Referring to FIG. 2, weigh 5 g of natural graphite flakes and 2.5 g of $NaNO_3$ powders, respectively, add the natural graphite flakes and the $NaNO_3$ powders into 130 ml of a $H_2SO_4$ solution with a concentration of 98 wt %, obtain an intermediate solution by stirring continuously for 2 h under ice bath conditions after mixing uniformly, weigh 15 g of $KMnO_4$ powers, put the $KMnO_4$ powers and the intermediate solution into a reaction beaker, react for 2 h, perform a water bath on the reaction beaker under 37° C. for 1 h, increase a temperature of the water bath to 98° C., add 230 ml of deionized water into the reaction beaker, react for 30 min, add 400 ml of deionized water and 10 ml of $H_2O_2$ into the reaction beaker, stir for 1 h with a magnetic stirrer, remove $SO_4^{2-}$ by washing with an HCl solution with a concentration of 37.5 wt %, repeatedly wash with a certain amount of deionized water till PH=7, obtain a graphene oxide solution, obtain graphene oxide flakes by performing centrifugal drying annealing treatment on the graphene oxide solution, and obtain the graphene oxide dispersion liquid by distributing uniformly the graphene oxide flakes in liquid nitrogen below −200° C. under high pressure, which is able to maintain excellent electrical and thermal properties of graphene oxide.

(2) Preparation of Pressurized Solid Particles (Taking Dry Ice as an Example)

Referring to FIG. 2, firstly pressurize $CO_2$ to above 0.52 MPa, obtain liquid $CO_2$ by liquefying the pressurized $CO_2$ through cooling, obtain solid $CO_2$ by throttling and cooling the liquid $CO_2$ to −56.6° C. and below 0.52 MPa, grind the solid $CO_2$ into solid microparticles which are the pressurized solid particles with a size in a range of 50 nm to 1 μm.

(3) Preparation of Porous Three-Dimensional Graphene

Figure 3:
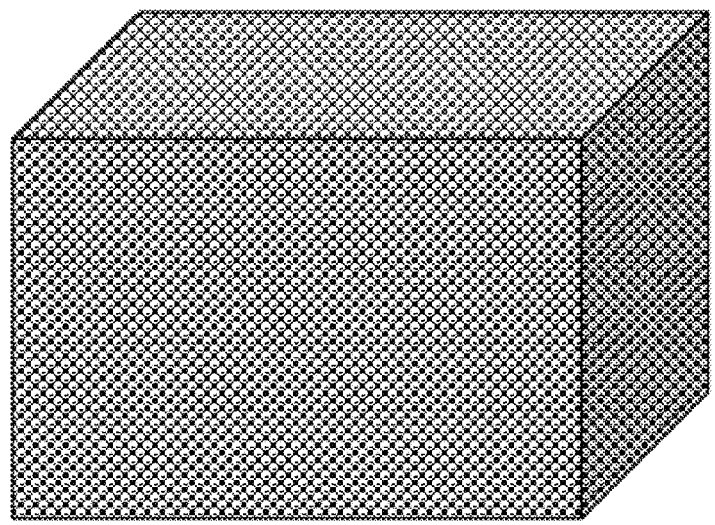
FIG. 3 shows graphene oxide enwraps around pressurized solid particles.
Figure 4:
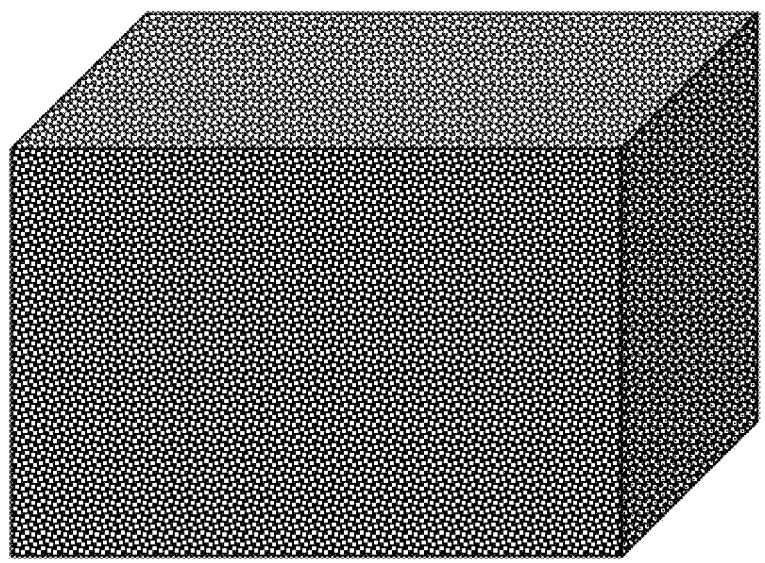
FIG. 4 is a structurally schematic view of three-dimensional graphene.

Referring to FIG. 2, fill an indentation, having a length of 2 cm, a width of 1 cm and a height of 0.5 μm, with the pressurized solid particles, put a certain amount of the prepared graphene oxide dispersion liquid into the indentation, wherein the certain amount of the prepared graphene oxide dispersion liquid just covers the pressurized solid particles, remove the liquid nitrogen in the graphene oxide dispersion liquid by increasing to a temperature in a range of −120° C. and −200° C. under high pressure such that the graphene oxide flakes enwrap around the pressurized solid particles, obtain a graphene oxide block (as shown in FIG. 3) by extruding after all of the graphene oxide flakes enwrapping around the pressurized solid particles, wherein the graphene oxide block contains the pressurized solid particles, volatilize the pressurized solid particles in the graphene oxide block by putting the graphene oxide block under normal temperature and pressure, form holes in the graphene oxide block, and anneal, thereby obtaining the porous three-dimensional graphene (as shown in FIG. 4).

(4) Preparation of the Three-Dimensional Graphene Antenna

Clean a dielectric substrate, deposit a metal layer with a thickness of 0.5 μm on a bottom surface of the dielectric substrate in a mixed atmosphere of Ar and $O_2$, obtain a three-dimensional graphene radiation layer by transferring the porous three-dimensional graphene on a top surface of the dielectric substrate, and deposit a metal strip which acts as a feeder line at one side of the porous three-dimensional graphene, thereby obtaining the three-dimensional graphene antenna.

What is claimed is:

1. A preparation method of a three-dimensional graphene antenna, wherein:
   the three-dimensional graphene antenna comprises a three-dimensional graphene radiation layer (1), a dielectric substrate (3), a metal layer (4) and a feeder line (2), wherein the three-dimensional graphene radiation layer (1) is attached to a top surface of the dielectric substrate (3), the metal layer (4) is attached to a bottom surface of the dielectric substrate (3), the feeder line (2) is provided at one side of the three-dimensional graphene radiation layer (1) and on the dielectric substrate (3);
   the preparation method comprises steps of:
   (A) selecting a material with low dielectric constant as a dielectric substrate (3);
   (B) preparing the three-dimensional graphene radiation layer (1) which comprises:
   (B1) at a temperature below −200° C. and a pressure above 0.5 MPa, pressurizing gas whose intermolecular force is greater than repulsive force into a solid, and crushing the solid into solid micro particles which are pressurized solid particles;
   (B2) preparing graphene oxide flakes, obtaining a graphene oxide dispersion liquid by distributing the graphene oxide flakes in liquid nitrogen at the temperature below −200° C. and the pressure above 0.5 MPa;
   (B3) obtaining a mixed solution containing the pressurized solid particles and the graphene oxide flakes by adding the pressurized solid particles into the graphene oxide dispersion liquid, the graphene oxide flakes enwrapping around the pressurized solid particles by removing the liquid nitrogen in the mixed solution through increasing a temperature of the mixed solution, wherein the increased temperature is lower than a sublimation temperature of the pressurized solid particles, and after all of the graphene oxide flakes in the mixed solution enwrap around the pressurized solid particles, obtaining a graphene oxide block containing the pressurized solid particles by extruding; and
   (B4) sublimating the pressurized solid particles in the graphene oxide block into gas by increasing a temperature and decreasing a pressure of the graphene oxide block, forming holes in the graphene oxide block, obtaining a porous three-dimensional graphene by annealing in a vacuum condition, and obtaining the three-dimensional graphene radiation layer (1) by transferring the porous three-dimensional graphene to the top surface of the dielectric substrate (3); and
   (C) preparing the feeder line (2) and the metal layer (4), which comprises:
   (C1) plating a layer of metal on the bottom surface of the dielectric substrate (3) as the metal layer (4), wherein a stable radiation field is formed between the metal layer (4) and the three-dimensional graphene radiation layer (1); and
   (C2) depositing a metal strip as the feeder line (2) at one side of the three-dimensional graphene radiation layer (1) for transmitting signals produced by the radiation field, thereby obtaining the three-dimensional graphene antenna.

2. The preparation method according to claim 1, wherein the pressurized solid particles have a size in a range of 50 nm and 1 μm.

3. The preparation method according to claim 2, wherein in the step (B3), the liquid nitrogen in the mixed solution is removed by increasing the temperature in a range of −200° C. and −120° C., which is able to ensure volatilization of the liquid nitrogen, and the solid micro particles formed by gas condensation are not volatilized.

4. The preparation method according to claim 3, wherein a density of the holes is determined by a quantity of the solid micro particles in the graphene oxide dispersion liquid.

5. The preparation method according to claim 4, wherein a size of each of the holes is determined by a size of each of the solid micro particles.

* * * * *